United States Patent [19]

Piette et al.

[11] 4,179,025

[45] Dec. 18, 1979

[54] CONVEYOR SYSTEMS UTILIZING A CHAIN DRIVE MEANS

[75] Inventors: Remi R. Piette, Paris; Francois M. A. Hubert, Vaucresson, both of France

[73] Assignee: Tissmetal Lionel-Dupont, Lyons, France

[21] Appl. No.: 796,200

[22] Filed: May 12, 1977

[30] Foreign Application Priority Data

May 18, 1976 [FR] France ................................ 76 14938

[51] Int. Cl.$^2$ .............................................. B65G 23/16
[52] U.S. Cl. ...................................... 198/833; 198/852
[58] Field of Search ............... 198/833, 838, 845, 850, 198/851, 852, 853

[56] References Cited

U.S. PATENT DOCUMENTS

| | | | |
|---|---|---|---|
| 2,024,846 | 12/1935 | Burgess et al. | 198/850 |
| 2,648,423 | 8/1953 | Black | 198/833 |
| 3,379,300 | 4/1968 | Karr | 198/852 |
| 3,498,445 | 3/1970 | Piper | 198/833 |
| 3,554,360 | 1/1971 | Bildsoe | 198/833 |
| 3,877,567 | 4/1975 | Sommerfield | 198/845 |
| 3,881,592 | 5/1975 | Stimpson | 198/845 |
| 3,893,564 | 7/1975 | Raynor et al. | 198/833 |

*Primary Examiner*—Jeffrey V. Nase
*Attorney, Agent, or Firm*—Cooper, Dunham, Clark, Griffin & Moran

[57] ABSTRACT

A conveyor system consists of an endless loop of pallet assemblies linked together and mounted on a number of modules positioned end-to-end. One, at least, of these modules is a drive module but the remainder are non-powered. The drive module includes a pair of chains having links whose pitch is a sub-multiple of the pitch of the teeth on driving wheels. Teeth are provided on the pallet assemblies to engage the chains. A lateral guide roller has an axle which serves also as part of an articulated joint between successive pallet assemblies. The pallet assemblies can each be formed of a rigid portion linked to a flexible portion. Each pallet assembly has a pair of guide rollers to engage guide sections for vertical positioning. A single chain drive and pins on the pallet assemblies to engage the chain are alternatives.

1 Claim, 10 Drawing Figures

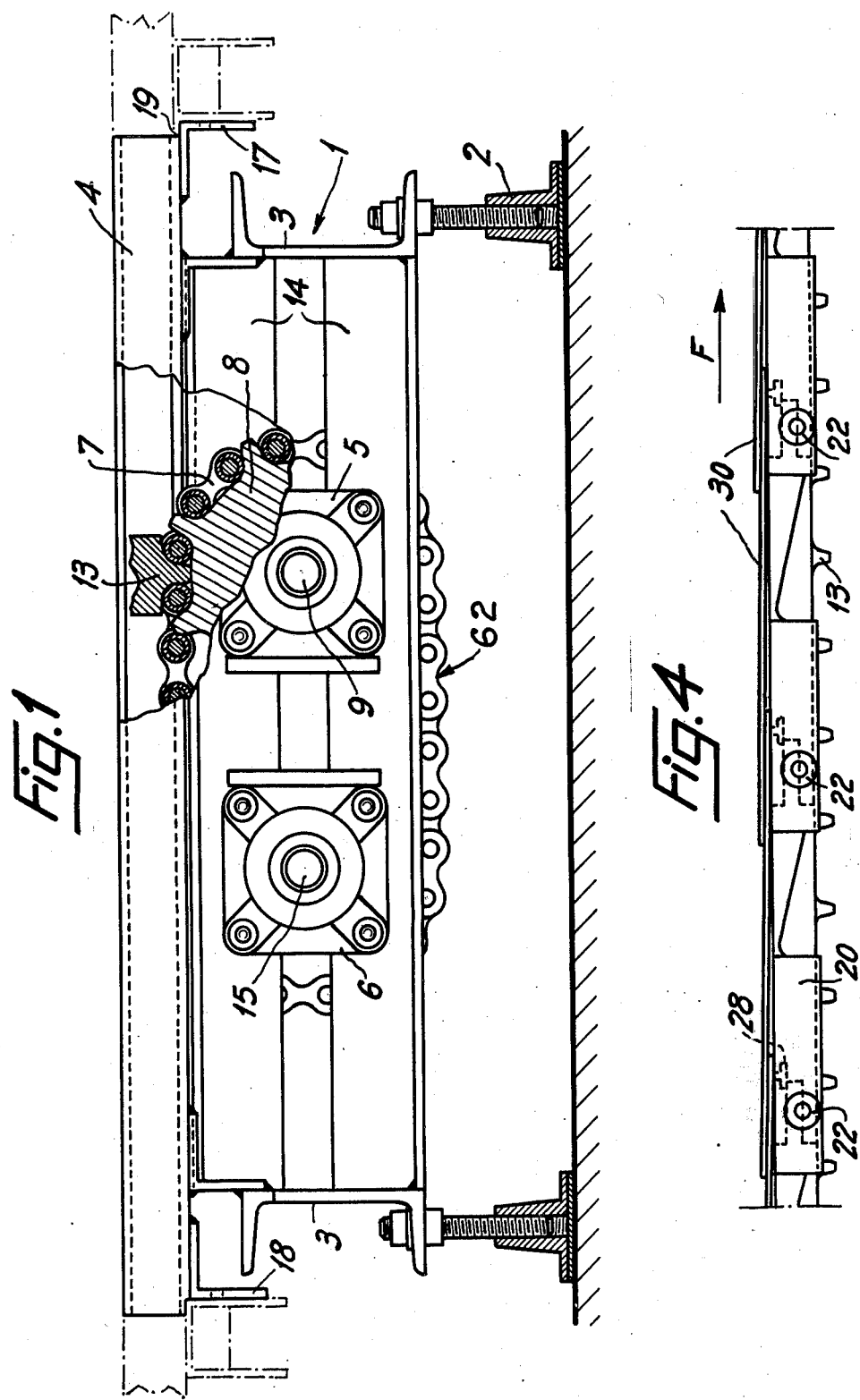

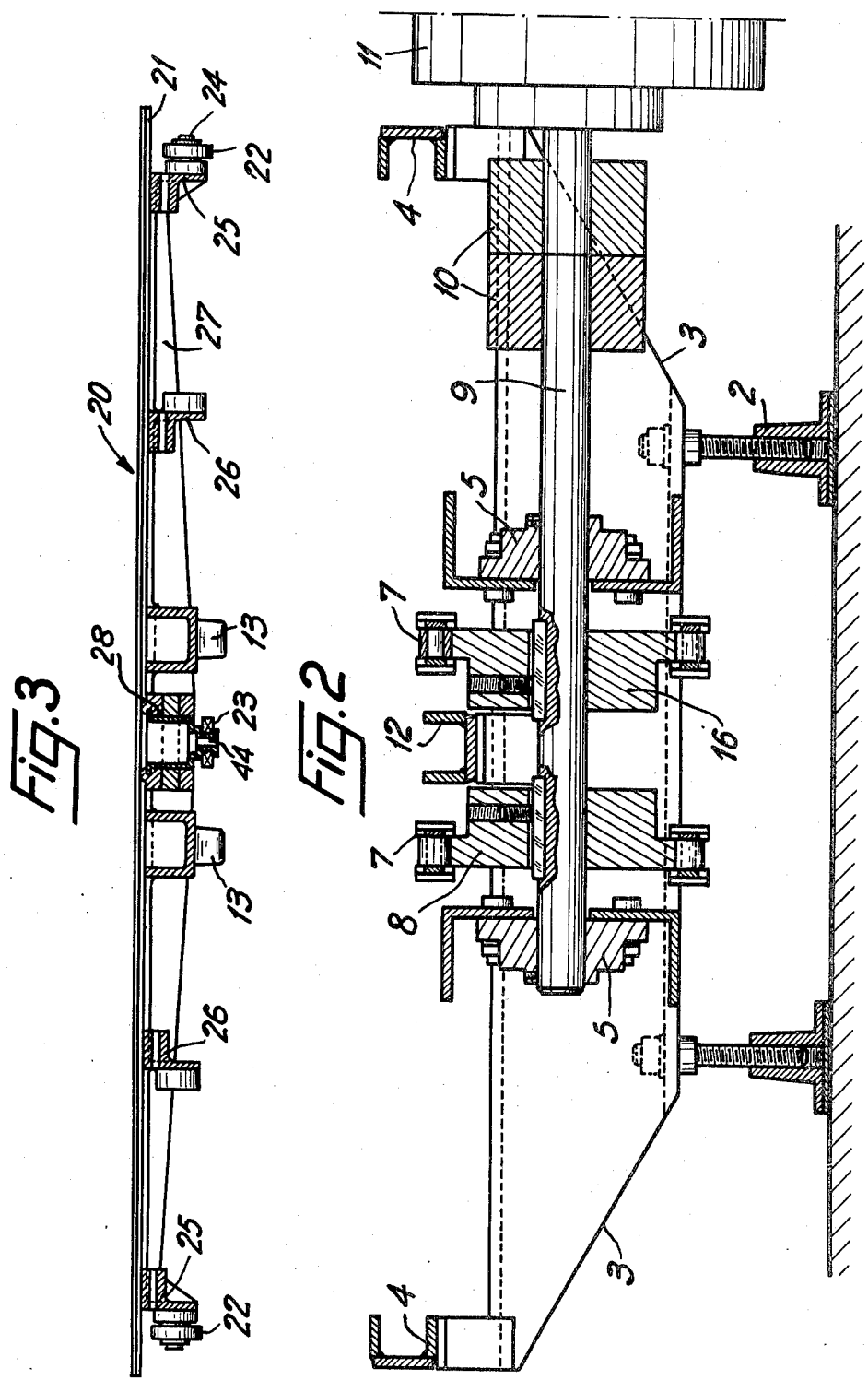

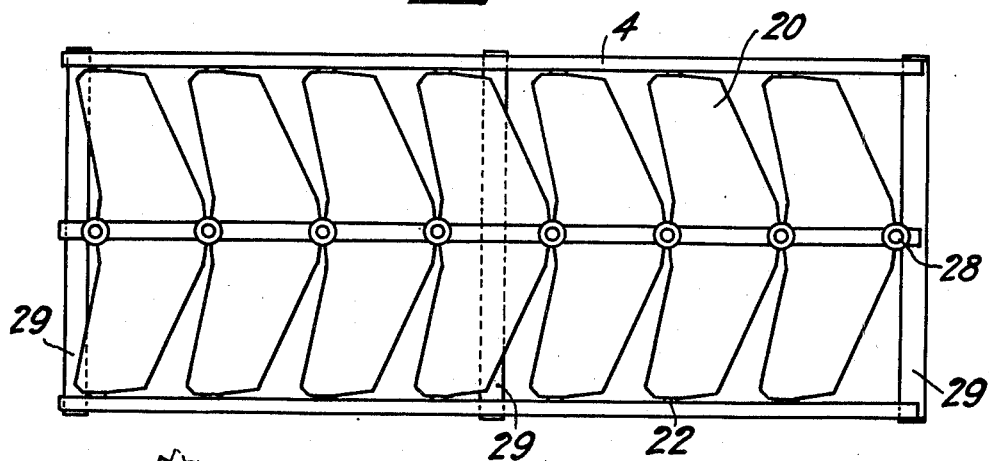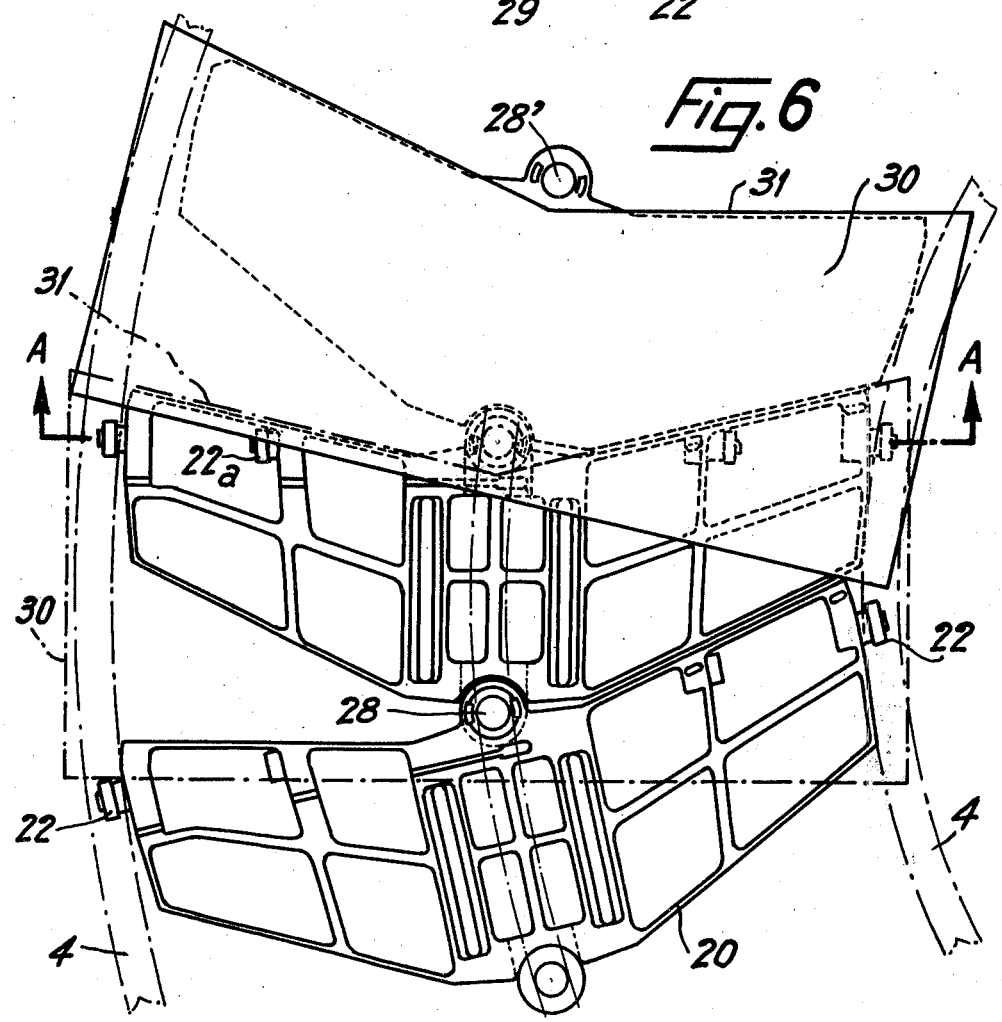

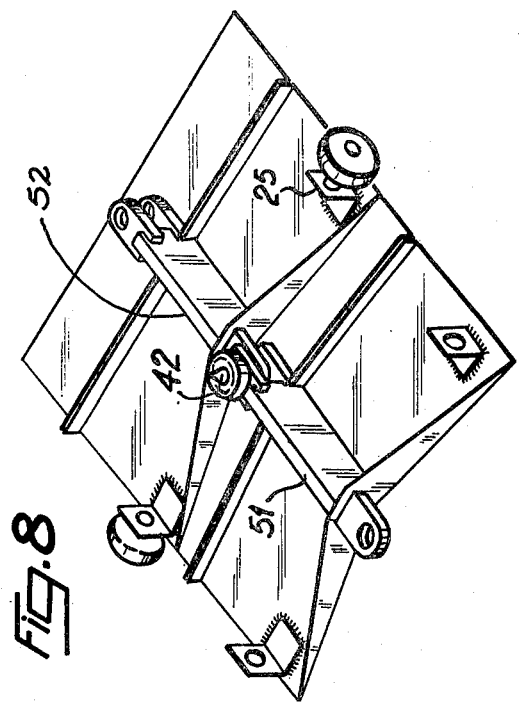
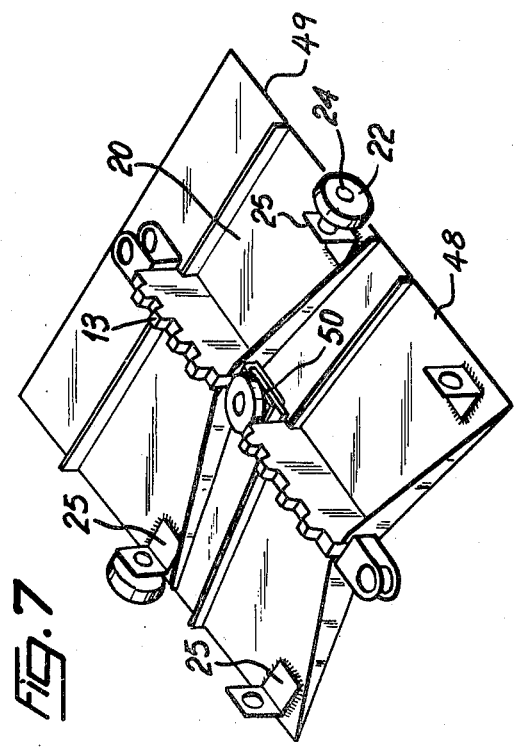

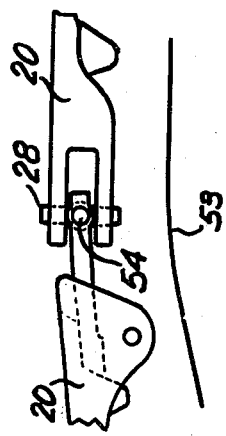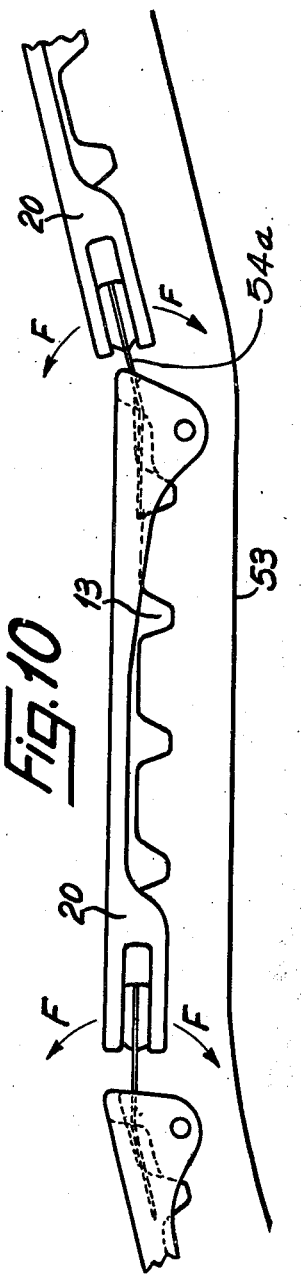

CONVEYOR SYSTEMS UTILIZING A CHAIN DRIVE MEANS

This invention relates to a conveyor system comprising a multiplicity of pallet assemblies linked to each other end-to-end in a closed loop.

French Patent Specification No. 1,239,470 describes a conveyor system in which each pallet assembly of the system is mechanically linked to a drive chain and bearing and guide rollers are provided.

U.S. Pat. No. 2,753,983 describes another example of an endless conveyor having a number of elements linked to each other.

U.S. Pat. No. 3,777,877 describes a conveyor assembly employing hexagon-shaped pallets pivotally mounted to hinged support members in a manner which permits the conveyor to be banked.

Yet another conveyor system is described in French Patent specification No. 1,590,361.

British Patent Specification No. 873,688 describes a conveyor using an endless belt. Other examples of prior art are U.S. Pat. No. 3,107,773; U.S. Pat. No. 3,410,390; German Patent Application No. 2,205,909 and German Patent Application No. 1,919,801.

It is an object of the invention to provide an improved conveyor system.

According to the invention a conveyor system comprises a multiplicity of pallet assemblies linked to each other end-to-end in a closed loop, support and guide means mounting said pallet assemblies for movement about said loop, and drive means connected to drive said pallet assemblies around said loop, and in which the improvement consists of said support and guide means comprising a multiplicity of co-operating support and guide modules arranged end-to-end at least one of said modules including drive means.

A conveyor system embodying the present invention and shortly to be described with reference to the accompanying drawings employs standard modules positioned end-to-end, the drive system of the pallet assemblies being particularly simple. Each pallet assembly comprises a pallet on a pallet support.

In the described system, the pallet assemblies have pallets which each have a rear portion overlapping the preceding pallet assembly, the rear portion being the trailing portion in the direction of circulation of the conveyor system. The pallet supports are linked by axles which are substantially vertical, carry guide means, and each pallet support is provided with bearing means. The pallet supports are carried by an end-to-end assembly of modules having guide tracks and roller tracks, at least one of the modules also carrying drive means for the pallet assemblies.

The linked pallet assemblies can be thought of as a "vertebral column" which may thus have any desired lenth, since the joining together of a larger or smaller number of modules and pallet assemblies is all that is required.

Thus, the function of transporting objects and the function of driving the conveyor are partially dissociated insofar as there is one specialised mechanical drive module and several non-powered transport modules. There is, of course, a mechanical association of all the modules by virtue of the series-connected pallet assemblies.

The invention thus involves a conveyor system utilizing a number of pallet assemblies linked to each other in a closed loop and incorporating a drive means that has at least one toothed wheel. Teeth on the pallet assemblies engage selected ones of the openings in the links of a drive chain utilized in the system, while the teeth of the driving wheel engage other ones of the openings in the links of the chain. In the system, the upper surfaces of the pallets form a continuous platform, and the pallet supports are linked to each other by means of vertical bearing axle providing a dismantle connection between successive pallet assemblies. The vertical bearing axle has an end portion which engages the driving chain.

A conveyor system constructed in accordance with the invention will now be described with reference to the accompanying drawings, in which:

FIG. 1 is a partly-broken-away side elevation of a drive module of the conveyor system;

FIG. 2 is a cross-section through the module of FIG. 1;

FIG. 3 is a cross-section through a pallet assembly of the conveyor system, the section being taken along the line A—A marked in FIG. 6;

FIG. 4 is a side-view of a number of pallets assemblies linked together;

FIG. 5 is a plan view of non-powered module of the conveyor system, the pallets not being shown;

FIG. 6 is a plan view of pallet assemblies negotiating a bend in the conveyor system;

FIG. 7 is a view of a pallet support turned bottom uppermost to show its drive teeth;

FIG. 8 is a view of an alternative pallet support turned bottom uppermost to show its vertical drive pin;

FIG. 9 shows a method of linking two pallet supports by means of a Cardan joint to allow a vertical displacement between them; and FIG. 10 shows another method of flexibly linking two pallet supports.

The conveyor system, the parts of which are illustrated in the drawings, consists of an endless loop of pallet assemblies linked together and mounted on a number of modules positioned end to end. One, at least, of these modules is a drive module and the remainder of the modules are non-powered.

Referring to FIGS. 1 and 2, the mechanical drive module, indicated generally as reference 1, is mounted on a supporting surface by four screw-jacks 2. The drive module 1 has a framework 3 which is mounted on the screw-jacks 2 and carries two channel-shaped elongate guide sections 4. These guide sections 4 guide the pallet supports around the conveyor system and define their vertical position.

The drive module 1 has side members 14 which mount two bearing blocks 5 and two bearing blocks 6. An axle 9 is rotatably mounted by the two blocks 5 and an axle 15 is rotatably mounted by the two blocks 6. Two toothed-wheels 8, 16 are fixed on the axle 9. The axle 9 and the wheels 8, 16 are driven through a coupling 10 by a motor-reducer 11. The pitch of the teeth on the wheels 8, 16 is such that one link 7 of a respective chain for each wheel can just fit between two teeth (see FIG. 1). Similar wheels (not explicitly shown) are mounted on the axle 15.

In practice, a toothed wheel of this kind can be obtained by removing one teeth in every two from an ordinary gear wheel.

Pallet supports (which will be described in more detail later) carry teeth 13, the width of which is substantially the same as the width of the teeth of the wheels 8, 16. These teeth are integral with the pallet supports and are received within the links 7 of the chains. Axle 9 is a drive shaft and the axle 15 is a driven shaft. The wheels 8, 16 are keyed onto the shaft 9 but the wheels on shaft 15, or at least one of them, are freely mounted. The axle 15 and wheels can be replaced by other structure simulating their effect, for example each chain being guided by rails on which it can roll or slide. The axle 15 could carry plain wheels without teeth as another alternative. It is even possible to omit the chains and to drive the teeth 13 directly by means of the toothed wheels. Although, as shown, the teeth 13 are arranged to mesh in a vertical plane it would alternatively be possible to have an arrangement in which the teeth mesh in a horizontal plane.

The frame work 3 also mounts another channel-shaped elongate member 12, the function of which is to guide the pallet supports laterally, although in some cases the meshing of the teeth 13 with the chains could alternatively provide guidance.

As shown in FIG. 1, the upper part of the framework 3 carries two members 17 and 18 of L-section arranged cross-wise, one at each end of the module. Member 17 together with the righthand ends of the guide sections 4 define a female connecting portion. On the other hand, the member 18 is set back somewhat from the left-hand of the guide sections 4 to define a male connecting portion. Male and female connecting portions are provided similarly on the unpowered modules so that a number of modules can be mated end-to-end to provide a continuous run of guide sections 4 so that the pallet assemblies can move smoothly from one module to the next. This feature is illustrated in broken outline in FIG. 1.

FIGS. 1 and 2 as stated show a mechanical drive module and one module of this type will suffice in a conveyor system. If, however, the characteristics of the system (for example, its length, bends, or the load) demand it, one or more extra drive modules can be included in the system.

The non-powered modules are basically of the same construction as the drive module, that is, a framework 3 mounted on jacks 2 and carrying on its upper part guide sections 4. Preferably, each non-powered module has a substantially greater length than the drive module as this facilitates the insertion of the drive module at any desired part of the conveyor system.

FIG. 3 is a section taken along the line A—A of FIG. 6 through a pallet support which is denoted generally by reference 20 and of which several alternative forms will be described. Each pallet support 20 consists of a platform 21 to mount the pallet, and two bearing rollers 22 to ride in the track defined by the guide sections 4 (FIG. 2). A lateral guide roller 23 having a vertical axle 44 is provided to ride in the elongate member 12.

The rollers 22 are mounted on horizontal axles 24 carried by flanges 25. The axles of the two bearing rollers 22 are so positioned that their axes lie substantially on a straight line passing through the axis of articulation of two successive pallet supports so as to avoid the transmission of twisting torque in a connection linking two successive pallet supports. A second pair of flanges 26 are provided to enable the pallet support to be used with a narrower-gauge track if desired. The teeth 13 are formed as part of the plate 21 or can alternatively be secured to it. A transverse web 27 is provided to give transverse rigidity to the pallet support. In construction the pallet supports are slid into the guide track (sections 4) and thereafter assembled.

Figure 4 shows a number of pallets on their supports linked together, the arrow F indicating the direction in which they are moved. The pallets can, for example, be arranged at a 25.4 centimeter pitch, the pitch of the teeth being 6.35 centimeters and that of the chains 3.275 centimeters. Each pallet support 20 is linked to the preceding one and to the following one by, means of an axle 28 which is co-axial with axle 44. As seen in FIG. 6 each pallet support has an eye 28' to receive the axle 28. There is sufficient freedom provided in the connections between pallet supports to allow one pallet support to be vertically displaced from the next so the pallet supports can negotiate a circular arc of relatively large radius in a plane perpendicular to that of the conveyor system. The pallet supports 20 are covered in pallets or rubber or other resilient material, the surface of each pallet being higher than that of the pallet supports and arranged so that the upper surfaces of the pallets form a continuous platform. Alternatively, the pallets can be made of more or less rigid sheet metal.

FIG. 5 is a plan view of a non-powered module of the conveyor system, pallet supports but not their pallets being shown in the drawing. The guide track consisting of sections 4 is kept to its proper gauge by means of cross-pieces 29.

FIG. 6 shows a number of pallet assemblies negotiating a bend. The rollers 22 are guided vertically by the sections 4 and the pallet supports 20 swivel relative to each other about the fixed axles 28 and are guided laterally by the members 12. The pallets of the first two pallet assemblies are omitted from the drawing to illustrate better the relative movement of the pallet supports. The degree of movement possible limits the radius of curvature which can be negotiated.

The roller 23 (and its vertical axle 44) can be inserted directly into the members 12 which allows assembly without the need for special tools, as well as making it possible for a pallet support at any point on the conveyor system to be removed from the chain, by dismantling one lateral guide assembly of that pallet support and disconnecting its eye 28' from the lateral guide assembly of the next pallet support.

A single toothed wheel suffices for driving a chain and the pallet supports via the intermediary of the teeth and the non-powered toothed wheel can be replaced by a fixed guide of semicircular shape ensuring that the chain has a suitable tension using the pressure of a spring.

The driving of a chain and pallet supports can likewise be effected using a single powered wheel and thus using a single drive chain and a single row of teeth.

This chain can be wound either around a non-powered toothed wheel or around a guide part.

The described conveyor system is intended more especially for the transport of light loads which do not require a considerable driving force.

FIG. 7 shows a view of an alternative form of pallet support and its pallet to be driven by a single chain. In this embodiment, the pallet support is made up of two portions, one relatively rigid portion 48, and a second portion 49 which is more flexible. The two portions are linked by the axle 28 (not shown in FIG. 7) associated with the lateral guide roller (not shown either), a part of portion 48 being imprisoned in a cavity 50 of the other portion 49 by the axle 28. This feature enables a conveyor system to be obtained, the pallet assemblies of which can support larger loads, whilst retaining the flexibility necessary to the system.

In FIG. 7, although the pallet assembly is in two portions, the meshing with a chain is still effected via the intermediary of the teeth 13.

FIG. 8 likewise shows a pallet assembly to be driven by a single chain, but in this embodiment the driving and guiding are achieved by a pin 42 projecting through the lateral guide roller, this pin enters a link 7 of the chain, as did each tooth 13 in the preceding embodiment. In this embodiment, the pallet support 20 is likewise formed by two portions 51 and 52, linked by the axle 28.

FIGS. 9 and 10 show two forms of flexible connection between pallet supports, these connections permitting the conveyor to carry objects upwards or downwards.

In FIG. 9, two pallet supports 20 are jointed by two axles 28 and 54 functioning as a swivel, which enables the pallet assembles to follow the contours of the guide track 53 when the latter is not flat.

In the joint shown in FIG. 10, a pallet support 20 is linked to the following pallet support by means of a part 54a, which is flexible in the longitudinal direction, formed at least partially by a part cut out of spring-steel.

The pallet supports can again swivel with respect to one another and follow the roller track if it has slopes.

What is claimed is:

1. A conveyor system comprising a multiplicity of pallet assemblies linked to each other end-to-end in a closed loop, support and guide means mounting said pallet assemblies for movement about said loop and drive means connected to drive said pallet assemblies around said loop, wherein said drive means comprises at least one toothed wheel, chain means meshing with the teeth of said at least one wheel, the pitch of said chain means being a sub-multiple of the pitch of the teeth of said at least one wheel, and teeth means provided on said pallet assemblies having a pitch selected from the group consisting of a pitch equal to, and a pitch a multiple of, the pitch of the teeth of said at least one wheel, said teeth means of said pallet assemblies being adapted to engage selected ones of openings in the links of said chain means while the teeth of said at least one wheel engage other ones of the openings in the links of said chain means, in which each pallet assembly comprises a support, a pallet being removably mounted on a pallet support, so that the upper surfaces of the pallets form a continuous platform, said pallet supports being linked to each other end-to-end, and a vertical bearing axle providing a dismantable connection between successive pallet assemblies when the two adjacent pallets are removed, and wherein said vertical bearing axle has an end portion adapted to engage in a link of said chain means.

* * * * *